US011442739B2

(12) United States Patent
Liu et al.

(10) Patent No.: US 11,442,739 B2
(45) Date of Patent: Sep. 13, 2022

(54) EXCEPTION HANDLING

(71) Applicant: International Business Machines Corporation, Armonk, NY (US)

(72) Inventors: Ming Ran Liu, Beijing (CN); Bao Zhang, Beijing (CN); Naijie Li, Beijing (CN); Yuan Zhai, Beijing (CN); Sean Douglas Perry, Toronto (CA)

(73) Assignee: International Business Machines Carporation, Armonk, NY (US)

( * ) Notice: Subject to any disclaimer, the term of this patent is extended or adjusted under 35 U.S.C. 154(b) by 23 days.

(21) Appl. No.: 16/571,592

(22) Filed: Sep. 16, 2019

(65) Prior Publication Data
US 2021/0081208 A1 Mar. 18, 2021

(51) Int. Cl.
*G06F 9/38* (2018.01)
*G06F 11/07* (2006.01)
*G06F 9/54* (2006.01)

(52) U.S. Cl.
CPC ............ *G06F 9/3861* (2013.01); *G06F 9/542* (2013.01); *G06F 11/0772* (2013.01); *G06F 2201/865* (2013.01)

(58) Field of Classification Search
CPC .... G06F 9/3861; G06F 9/542; G06F 11/0772; G06F 2201/865
See application file for complete search history.

(56) References Cited

U.S. PATENT DOCUMENTS

| | | | | |
|---|---|---|---|---|
| 5,628,016 A | * | 5/1997 | Kukol | G06F 8/445 717/114 |
| 5,630,047 A | * | 5/1997 | Wang | G06F 11/1438 714/15 |
| 5,630,137 A | * | 5/1997 | Carney | G06F 9/4812 714/E11.023 |
| 5,761,407 A | * | 6/1998 | Benson | G06F 9/4812 714/37 |
| 5,778,369 A | * | 7/1998 | Pascoe | G06F 11/0718 |
| 6,247,169 B1 | * | 6/2001 | DeLong | G06F 9/4843 712/244 |

(Continued)

OTHER PUBLICATIONS

"Stack Unwinding in C++", Geeks for Geeks, May 29, 2017 (Year: 2017).*

(Continued)

*Primary Examiner* — Douglas M Slachta
(74) *Attorney, Agent, or Firm* — Jeffrey M. Ingalls

(57) ABSTRACT

Embodiments of the present disclosure relate to a method, system, and computer program product for exception handling. In some embodiments, a method is disclosed. According to the method, in response to an application throwing an exception, a target stack frame for handling the exception is detected from a call stack of the application. The call stack comprises a plurality of stack frames. One of the plurality of stack frames corresponds to a function called by the application and supports either a one-phase exception handling mechanism or a two-phase exception handling mechanism. In response to the target stack frame being detected from the call stack, the target stack frame is caused to handle the exception. In other embodiments, a system and a computer program product are disclosed.

20 Claims, 12 Drawing Sheets

(56) References Cited

U.S. PATENT DOCUMENTS

| | | | |
|---|---|---|---|
| 6,308,318 B2 * | 10/2001 | Krishnaswamy | G06F 9/542 712/227 |
| 6,934,832 B1 * | 8/2005 | Van Dyke | G06F 9/3851 712/244 |
| 6,993,751 B2 * | 1/2006 | Bhansali | G06F 8/427 717/137 |
| 7,003,778 B2 * | 2/2006 | Sokolov | G06F 9/45504 719/318 |
| 7,007,198 B2 * | 2/2006 | Boling | G06F 9/4812 714/17 |
| 7,089,273 B2 * | 8/2006 | Wu | G06F 12/0261 |
| 7,089,540 B2 * | 8/2006 | Ogasawara | G06F 8/41 710/200 |
| 7,194,744 B2 * | 3/2007 | Srivastava | G06F 9/3861 712/E9.06 |
| 7,240,343 B2 * | 7/2007 | Ogasawara | G06F 8/4441 717/154 |
| 7,281,271 B1 * | 10/2007 | Szor | G06F 21/52 713/165 |
| 7,426,719 B2 * | 9/2008 | Chaiken | G06F 9/4484 717/128 |
| 7,480,919 B2 * | 1/2009 | Bray | G06F 21/52 713/164 |
| 7,512,935 B1 * | 3/2009 | Cobb | G06F 11/3466 717/130 |
| 8,181,170 B2 | 5/2012 | Patil et al. | |
| 8,365,198 B2 * | 1/2013 | Duffy | G06F 9/546 719/318 |
| 9,304,778 B2 * | 4/2016 | Duffy | G06F 13/24 |
| 10,705,850 B2 * | 7/2020 | Teixeira | G06F 9/54 |
| 11,042,429 B2 * | 6/2021 | D'Souza | G06F 11/0778 |
| 2003/0018681 A1 * | 1/2003 | Subramanian | G06F 11/0748 712/E9.06 |
| 2003/0018961 A1 * | 1/2003 | Ogasawara | G06F 8/4441 717/158 |
| 2003/0023905 A1 * | 1/2003 | Boling | G06F 9/4812 714/34 |
| 2004/0128658 A1 * | 7/2004 | Lueh | G06F 9/4812 717/151 |
| 2004/0268330 A1 * | 12/2004 | Grover | G06F 8/423 717/146 |
| 2006/0282828 A1 * | 12/2006 | Mehta | G06F 9/4812 717/130 |
| 2008/0270990 A1 * | 10/2008 | Kornstaedt | G06F 9/4484 717/126 |
| 2010/0146522 A1 * | 6/2010 | Duffy | G06F 11/0715 719/318 |
| 2010/0262814 A1 * | 10/2010 | Pardoe | G06F 9/4812 712/E9.06 |
| 2011/0225402 A1 | 9/2011 | Grisenthwaite | |
| 2011/0264787 A1 * | 10/2011 | Mickens | G06F 11/3476 709/224 |
| 2015/0121354 A1 * | 4/2015 | Gschwind | G06F 9/30134 717/157 |
| 2015/0169388 A1 * | 6/2015 | Hildebrandt | G06F 9/542 719/318 |
| 2015/0356294 A1 * | 12/2015 | Tan | G06F 21/54 726/22 |
| 2019/0095209 A1 * | 3/2019 | Grant | G06F 9/324 |
| 2019/0108036 A1 * | 4/2019 | Texeira | G06F 9/461 |
| 2020/0218553 A1 * | 7/2020 | D'Souza | G06F 11/0712 |

OTHER PUBLICATIONS

Still et al., "Using Off-the-Shelf Exception Support Components in C++ Verification", arXiv:1703.02394v2 [cs.SE] May 31, 2018, 11 pages.

Mell et al., "The NIST Definition of Cloud Computing", Recommendations of the National Institute of Standards and Technology, Sep. 2011, 7 pages.

\* cited by examiner

EXCEPTION HANDLING

BACKGROUND

The present disclosure relates to software programming, and more specifically, to a method, a system, and a computer program product for exception handling.

Exception handling is one of the most important tasks in software programming. For a same programming language (such as, C++), different compilers may use different mechanisms for exception handling. Programs compiled by different compilers using different exception handling mechanisms are hardly compatible with each other. This will make it difficult for a user to choose an advanced new compiler, since the user has to recompile all of his/her legacy codes by using the new compiler.

SUMMARY

According to one embodiment of the present disclosure, there is provided a computer-implemented method. The method comprises in response to an application throwing an exception, detecting a target stack frame for handling the exception from a call stack of the application. The call stack comprises a plurality of stack frames. One of the plurality of stack frames corresponds to a function called by the application and supports either a one-phase exception handling mechanism or a two-phase exception handling mechanism. The method further comprises in response to the target stack frame being detected from the call stack, causing the target stack frame to handle the exception.

According to another embodiment of the present disclosure, there is provided a system. The system comprises a processing unit and a memory coupled to the processing unit. The memory stores instructions that, when executed by the processing unit, perform actions comprising: in response to an application throwing an exception, detecting a target stack frame for handling the exception from a call stack of the application, wherein the call stack comprises a plurality of stack frames, and one of the plurality of stack frames corresponds to a function called by the application and supports either a one-phase exception handling mechanism or a two-phase exception handling mechanism; and in response to the target stack frame being detected from the call stack, causing the target stack frame to handle the exception.

According to yet another embodiment of the present disclosure, there is provided a computer program product. The computer program product includes a computer readable storage medium having program instructions. The program instructions, when executed by a processor, cause the processor to perform a method comprising: in response to an application throwing an exception, detecting a target stack frame for handling the exception from a call stack of the application, wherein the call stack comprises a plurality of stack frames, and one of the plurality of stack frames corresponds to a function called by the application and supports either a one-phase exception handling mechanism or a two-phase exception handling mechanism; and in response to the target stack frame being detected from the call stack, causing the target stack frame to handle the exception.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
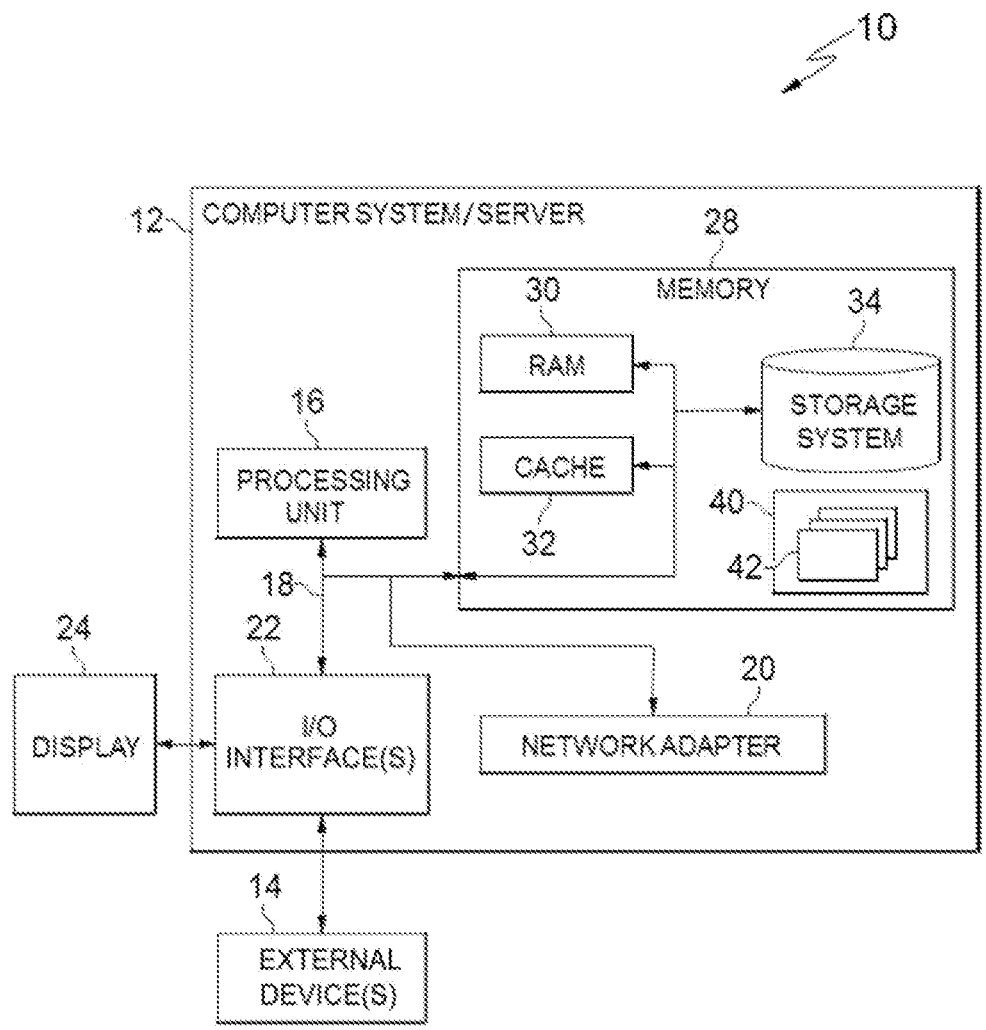
FIG. 1 depicts a cloud computing node according to an embodiment of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
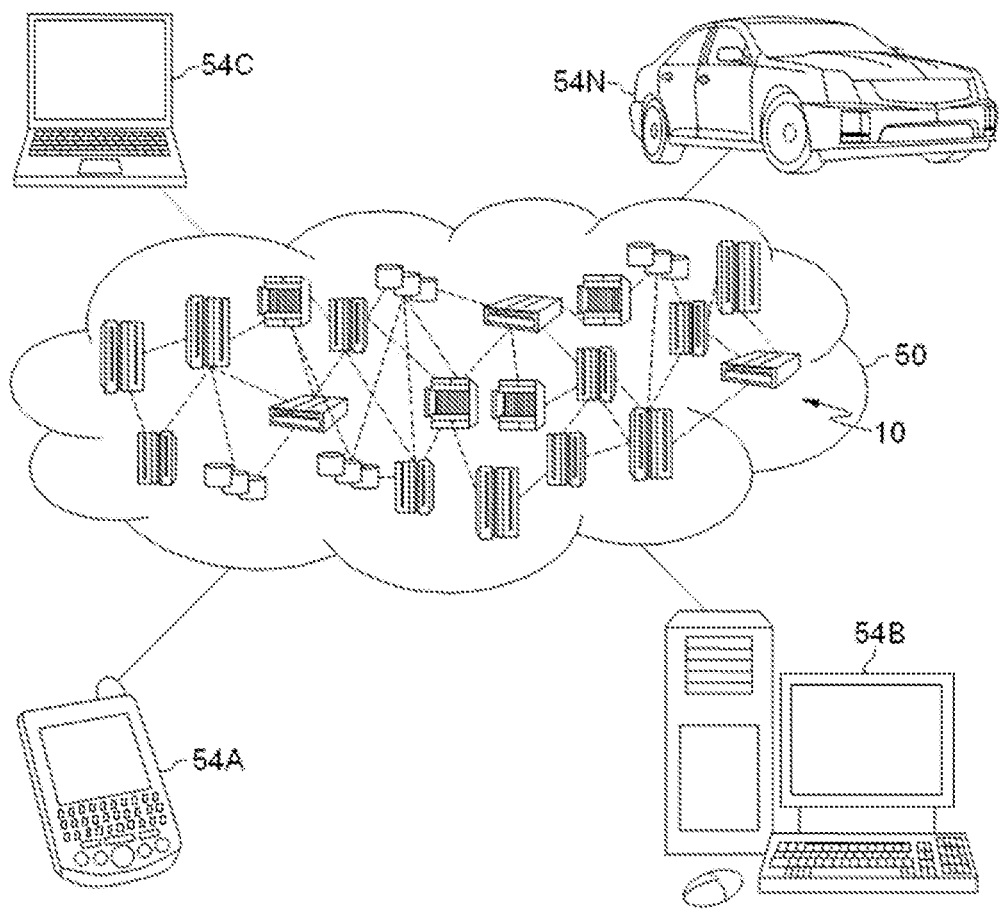
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
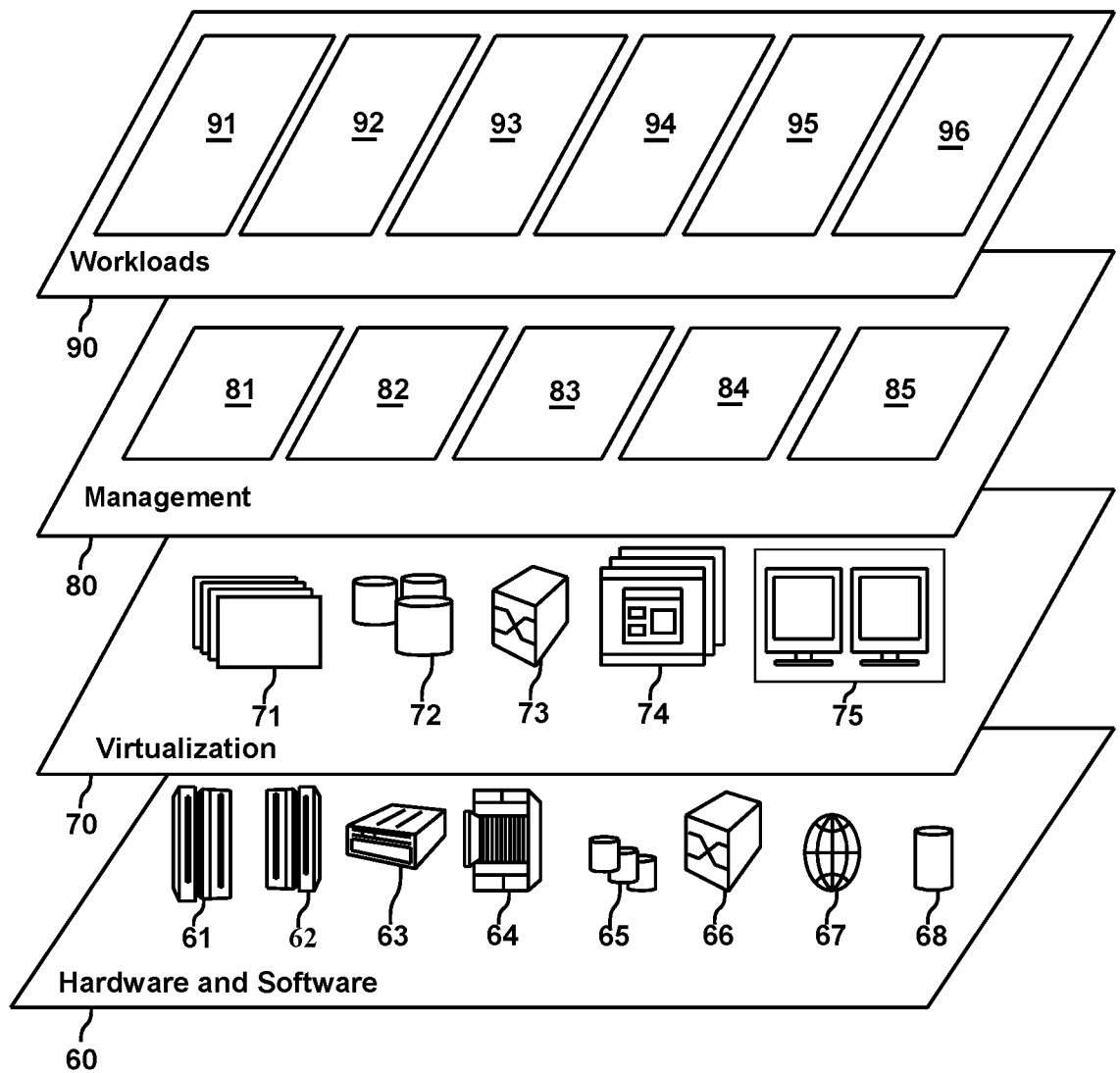
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and exception handling 96. Hereinafter, reference will be made to FIGS. 4A-6 to describe details of the exception handling 96.

As described above, exception handling is one of the most important tasks in software programming. For a same programming language, different compilers may use different mechanisms for exception handling.

For example, for C++, there are two different exception handling mechanisms. One of the exception handling mechanisms is called "one-phase unwinding exception handling mechanism" or "one-phase exception handling mechanism". In the one-phase exception handling mechanism, enough information may be recorded into a call stack (also referred to as "stack") of a program to unwind the call stack. As used herein, a call stack may comprise a plurality of stack frames and each of the plurality of stack frames may correspond to a function called by the program. When an exception is thrown by the program, the stack frames in the call stack will be traversed. For each stack frame, a destructor can be called if an event handler provided by the stack frame cannot catch the exception. The plurality of stack frames in the call stack are destructed during unwinding until the exception has been handled by a certain stack frame.

The other one is called "two-phase unwinding exception handling mechanism" or "two-phase exception handling mechanism". In the two-phase exception handling mechanism, some information is recorded into tables outside the call stack. When an exception is thrown by a program, two phases will be executed, which include a search phase and a cleanup phase. During the search phase, the plurality of stack frames in the call stack are traversed to search for a target stack frame capable of handling the exception. If the target stack frame is found, during the cleanup phase, the plurality of stack frames will be walked through again and stack frames on top of the target stack frame in the call stack will be destructed.

Programs compiled by different compilers using different exception handling mechanisms are hardly compatible with each other. This will make it difficult for a user to choose a new advanced compiler, since the user has to recompile all of his/her legacy codes by using the new compiler.

In order to at least partially solve the above and other potential problems, embodiments of the present disclosure provide a new solution to make the one-phase unwinding exception handling mechanism compatible with the two-phase unwinding exception handling mechanism. As such, a program compiled by a compiler using the one-phase unwinding exception handling mechanism can be linked together with another program compiled by another compiler using the two-phase unwinding exception handling mechanism. The user does not need to recompile all of his/her legacy codes to take advantage of a new compiler. This solution makes the one-phase unwinding exception handling mechanism and the two-phase unwinding exception handling mechanism work together, which helps the user to move his/her application to a new compiler in an evolutionary way.

Figure 4A:
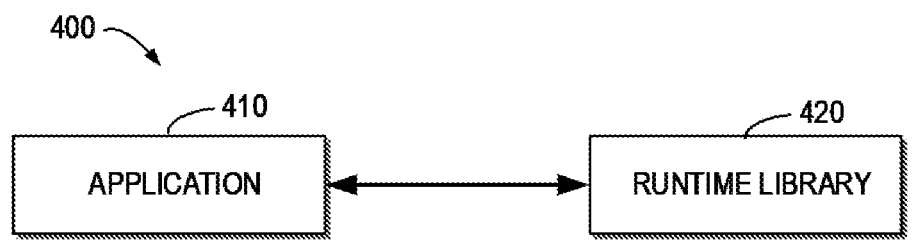
FIG. 4A depicts an environment in which embodiments of the present disclosure can be implemented.

With reference now to FIG. 4A, an environment 400 in which embodiments of the present disclosure can be implemented is shown. It is to be understood that the structure and functionality of the environment 400 are described only for the purpose of illustration without suggesting any limitations as to the scope of the present disclosure.

As shown in FIG. 4A, the environment 400 may generally comprise an application 410 and a runtime library 420. The application 410 may be a user program, which may call a plurality of functions. These functions may be compiled with different compilers, some of which may support the one-phase exception handling mechanism and other of which may support the two-phase exception handling mechanism. A plurality of stack frames corresponding to the plurality of functions may be maintained in a call stack of the application 410. The application 410 may throw an exception during runtime, which may trigger a process in the runtime library 420 to be executed. The runtime library 420 may identify the exception handling mechanism that a stack frame supports, and determine whether a search phase should be performed and how the search phase is to be performed. As such, a target stack frame capable of handling the exception can be detected from the call stack, no matter the target stack frame supports the one-phase exception handling mechanism or the two-phased exception handling mechanism. If the target stack frame is detected from the call stack, the exception can be handled by the target stack frame.

Figure 4B:
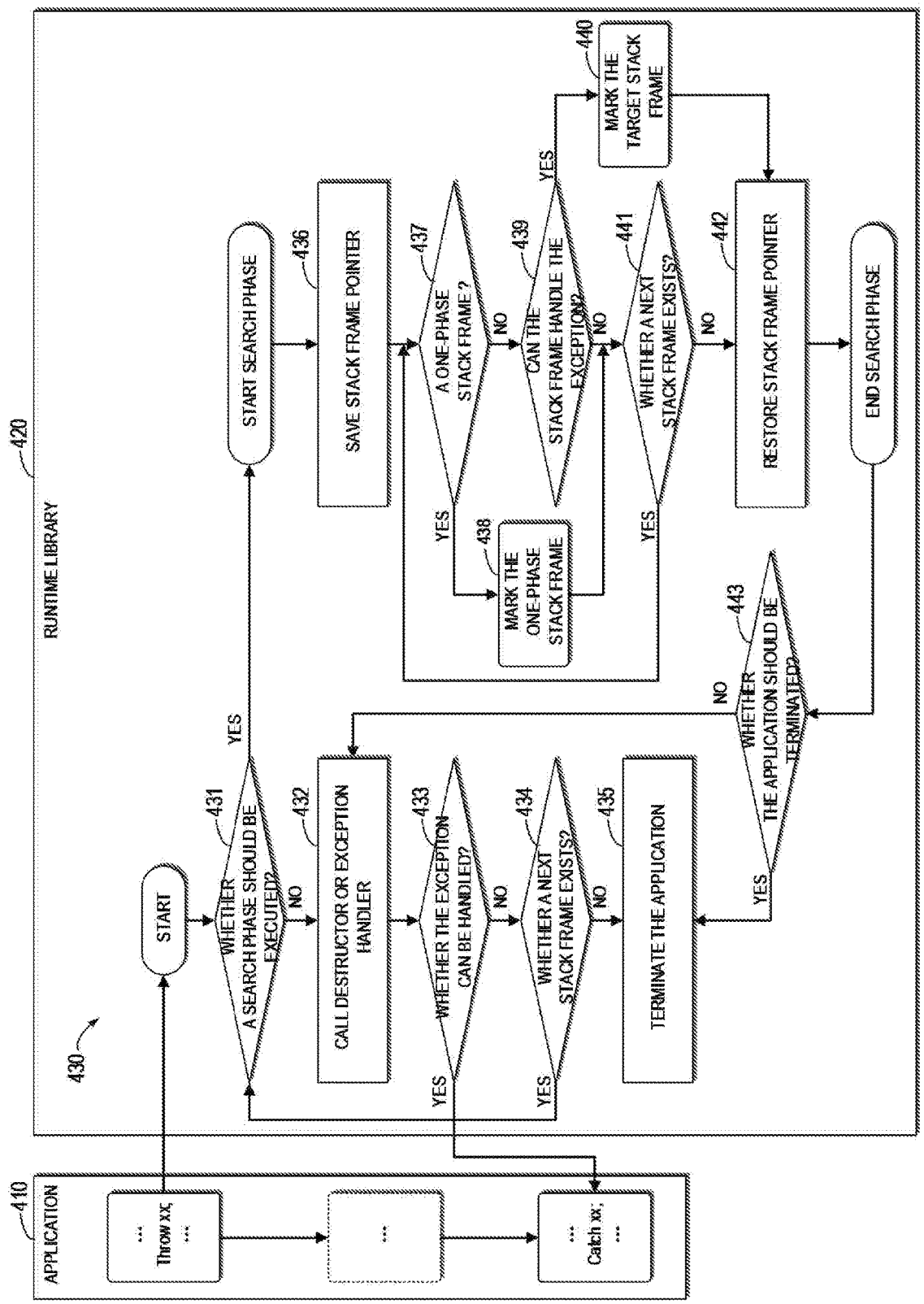
FIG. 4B depicts an example process for exception handling according to embodiments of the present disclosure.

With reference now to FIG. 4B, an example process 430 for exception handling according to embodiments of the present disclosure is shown. The process 430 is only shown for the purpose of illustration. It is to be understood that, the process 430 may include additional blocks (not shown) and/or may omit the illustrated blocks. The scope of the present disclosure described herein is not limited in this aspect.

The process 430 in the runtime library 420 may be executed in response to the application 410 throwing an exception. For example, at this moment, the call stack of the application 410 may have recorded a plurality of stack frames corresponding to a plurality of functions called by the application. For example, a stack frame corresponding to a function that is called later may be located closer to the top of the stack, while a further stack frame corresponding to a further function that is called earlier may be located closer to the bottom of the stack. The process 430 may traverse the stack frames from the top of the call stack to the bottom of the call stack.

As shown in FIG. 4B, at 431, it is determined whether a search phase should be executed. In some embodiments, for each stack frame, the runtime library 420 may check and determine whether a search phase should be executed. In some embodiments, the runtime library 420 may check the exception handling mechanism of this stack frame. For example, a compiler compiling a function may generate compilation information for the function, which may indicate the exception handling mechanism used by the compiler. The runtime library 420 may check the compilation information associated with this stack frame to identify which exception handling mechanism is used for this stack frame. If this stack frame supports the one-phase exception handling mechanism, it can be determined that the search phase should not be executed. If this stack frame supports the two-phase exception handling mechanism and a search phase has not ever been executed, it can be determined that the search phase should be executed.

If it is determined that the search phase should not be executed, at 432, a destructor for this stack frame or an event handler provided by this stack frame that might catch the exception can be called. For example, if the event handler provided by the stack frame cannot catch the exception, it can be determined that this stack frame is incapable of handing the exception. In this event, this stack frame will be destructed. Otherwise, if the event handler provided by the stack frame can catch the exception, it can be determined that this stack frame is capable of handing the exception. At 433, it is determined that whether the exception can be handled by this stack frame. If yes, the stack frame will take over control of the application 410, so as to handle this exception. Otherwise, at 434, the runtime library 420 may check whether a next stack frame exists in the call stack. If there is a next stack frame in the call stack, the process 430 proceeds to 431; otherwise, at 435, the application is terminated.

If it is determined (at 431) that the search phase should be executed, the search phase may be initiated to search for a stack frame supporting the two-phase exception handling mechanism and being capable of handling the exception in the call stack. Moreover, during the search phase, the runtime library 420 may also identify if one or more stack frames that support the one-phase exception handling mechanism exist in the call stack, so as to determine if the application 410 should be terminated after the search phase. During the search phase, the runtime library 420 may traverse the stack frames from the current stack frame to the bottom of the call stack.

As shown in FIG. 4B, at 436, a pointer pointing to the current stack frame can be saved, so as to be restored at the end of the search phase. At 437, the runtime frame may check the exception handling mechanism of the current stack frame (such as, by checking the compilation information). If the exception handling mechanism of the current stack frame is the one-phase exception handling mechanism, at 438, the current stack frame may be marked. Then, the process 430 proceeds to 441, where the runtime library 420 may check whether a next stack frame exists in the call stack. If there is a next stack frame in the call stack, the process 430 proceeds to 437. If there is no further stack frame in the call stack, at 442, the runtime library 442 may restore the pointer which is saved at 436, so as to end the search phase. If the exception handling mechanism of the current stack frame is the two-phase exception handling mechanism, at 439, the runtime library 420 may check if the current stack frame can handle the exception. For example, if the event handler provided by the current stack frame can catch the exception, it can be determined that the current stack frame can handle the exception; otherwise, it can be determined that the current stack frame cannot handle the exception. If it is determined that the current stack frame can handle the exception, at 440, this stack frame can be marked as a target stack frame for handling the exception. If it is determined that the current stack frame cannot handle the exception, at 441, the runtime library 420 may check whether a next stack frame exists in the call stack. If there is a next stack frame in the call stack, the process 430 proceeds to 437. If the target stack frame for handling the exception is identified or there is no further stack frame in the call stack, at 442, the runtime library 442 may restore the pointer which is saved at 436, so as to end the search phase.

After the search phase, at 443, the runtime library 420 determines whether the application should be terminated. For example, if the target stack frame for handling the exception is identified or at least one stack frame supporting the one-phase exception handling mechanism is identified, it can be determined that the application should not be terminated. In this event, the process 430 proceeds to 432. If no target stack frame for handling the exception is identified and no stack frame supporting the one-phase exception handling mechanism is identified, it can be determined that the application 410 should be terminated directly after the search phase. In this event, the process 430 proceeds to 435, so as to terminate the application 410.

FIGS. 5A-5F depict examples of exception handling according to embodiments of the present disclosure.

Figure 5A:
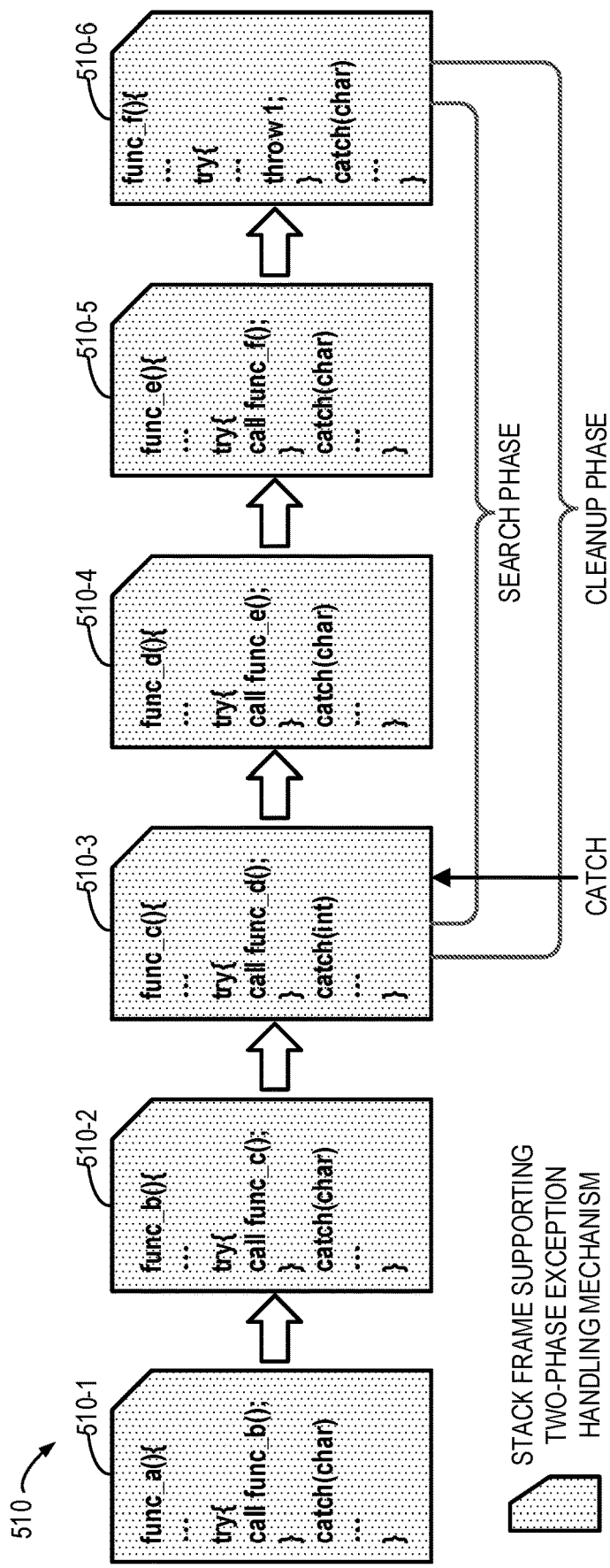
FIGS. 5A-5F depict examples of exception handling according to embodiments of the present disclosure.

FIG. 5A shows a call stack 510 comprising a plurality of stack frames 510-1, 510-2 . . . 510-6 (collectively referred to as "stack frames 510"), where the stack frame 510-1 corresponds to func_a ( ), the stack frame 510-2 corresponds to func_b ( ) called by the func_a ( ), the stack frame 510-3 corresponds to func_c ( ) called by the func_b ( ), the stack frame 510-4 corresponds to func_d ( ) called by the func_c ( ), the stack frame 510-5 corresponds to func_e ( ) called by the func_d ( ) and the stack frame 510-6 corresponds to func_f ( ) called by the func_e ( ). For example, the stack frames 510 all support the two-phase exception handling mechanism. The func_f ( ) may throw an exception with a value of 1, which is an integer.

In FIG. 5A, according to the process 430 as described above with reference to FIG. 4B, a search phase may start from the stack frame 510-6. The search phase will continue to be performed until the stack frame 510-3 which can handle the exception is identified. It can be seen that, the event handler "catch (int)" provided by the stack frame 510-3 can catch the exception with a value of 1. Therefore, the application will not be terminated after the search phase. Instead, a cleanup phase will be performed by destructing the stack frames 510-4, 510-5 and 510-6 which locate on top of the stack frame 510-3 in the call stack 510.

Figure 5B:
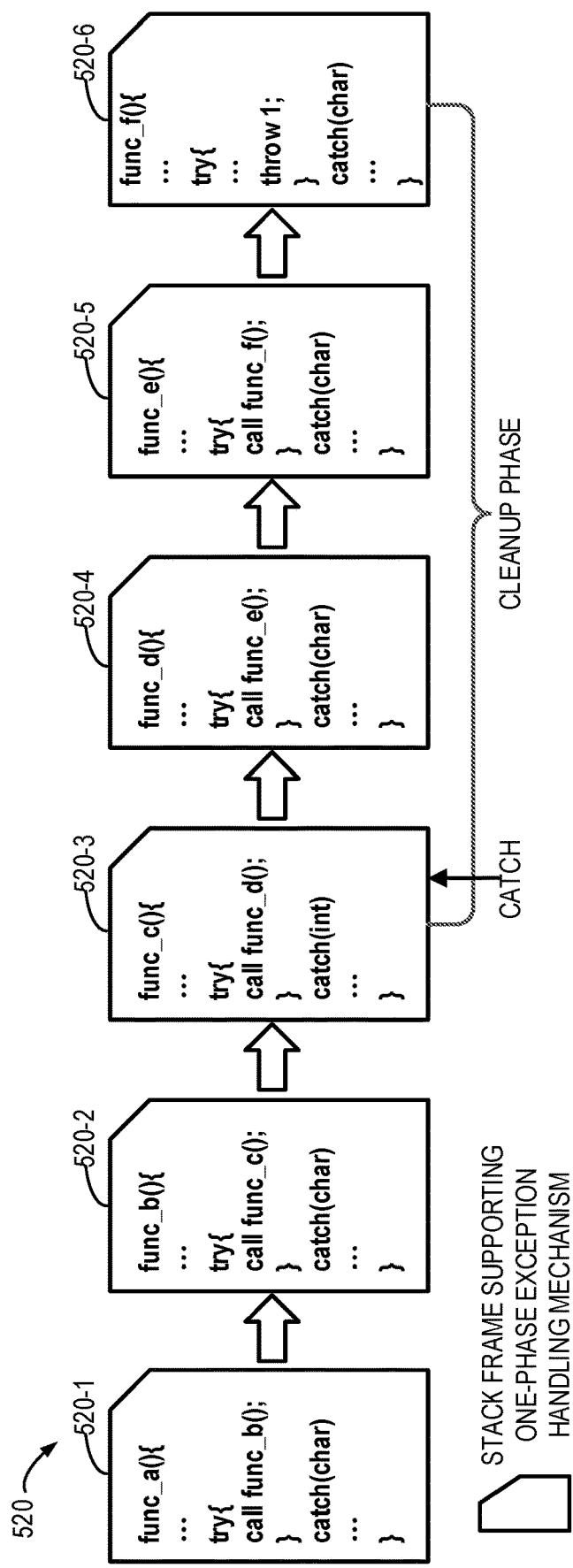

FIG. 5B shows a call stack 520 comprising a plurality of stack frames 520-1, 520-2 . . . 520-6 (collectively referred to as "stack frames 520"), where the stack frame 520-1 corresponds to func_a ( ), the stack frame 520-2 corresponds to func_b ( ) called by the func_a ( ), the stack frame 520-3 corresponds to func_c ( ) called by the func_b ( ), the stack frame 520-4 corresponds to func_d ( ) called by the func_c ( ), the stack frame 520-5 corresponds to func_e ( ) called by the func_d ( ) and the stack frame 520-6 corresponds to func_f ( ) called by the func_e ( ). For example, the stack frames 520 all support the one-phase exception handling mechanism. The func_f ( ) may throw an exception with a value of 1, which is an integer.

In FIG. 5B, according to the process 430 as described above with reference to FIG. 4B, the search phase will not be performed, since there is no stack frame supporting the two-phase exception handling mechanism in the call stack 520. A cleanup phase may be performed from the stack frame 520-6 by destructing stack frames whose event handlers cannot catch the exception. The event handler "catch (int)" provided by the stack frame 510-3 can catch the exception with a value of 1. Therefore, the stack frames 510-4, 510-5 and 510-6 which locate on top of the stack frame 510-3 in the call stack 510 may be destructed during the cleanup phase.

Figure 5C:
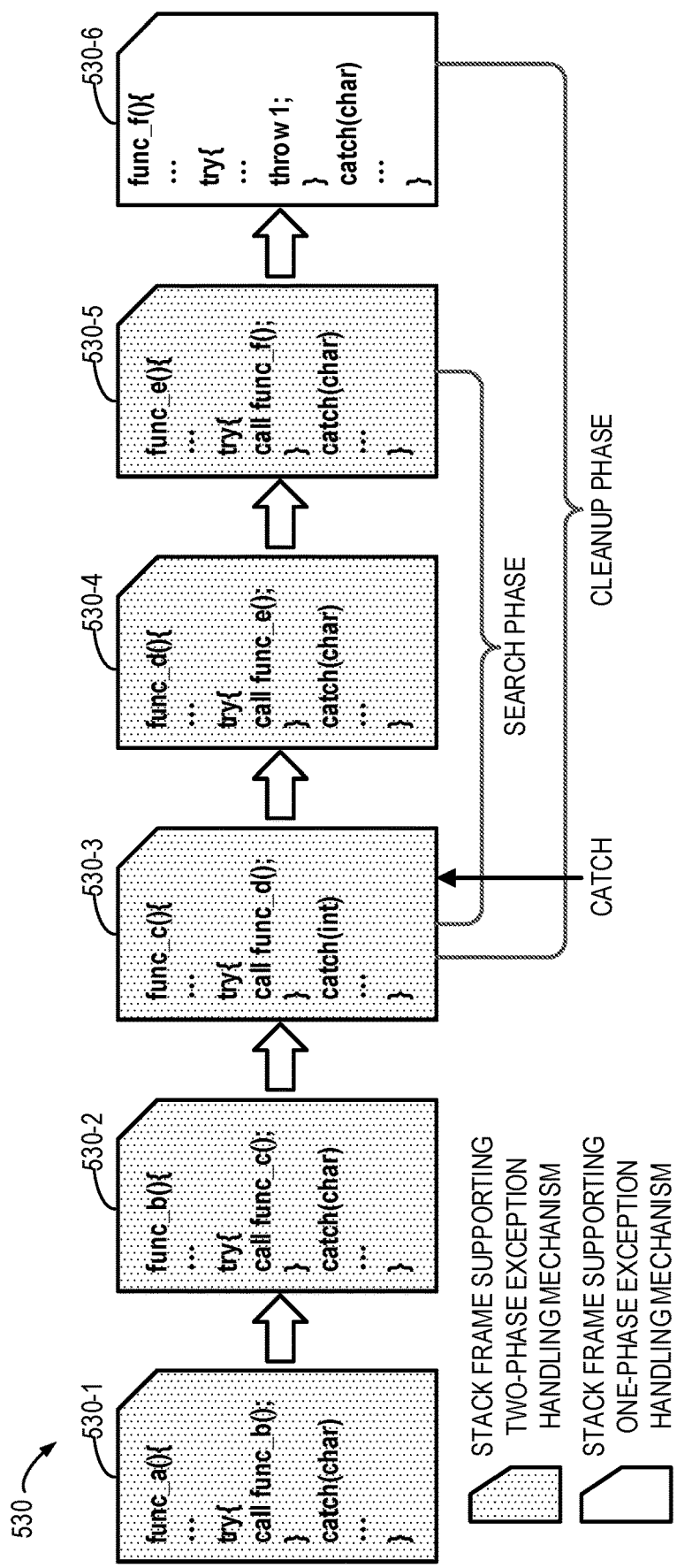

FIG. 5C shows a call stack 530 comprising a plurality of stack frames 530-1, 530-2 . . . 530-6 (collectively referred to as "stack frames 530"), where the stack frame 530-1 corresponds to func_a ( ), the stack frame 530-2 corresponds to func_b ( ) called by the func_a ( ), the stack frame 530-3 corresponds to func_c ( ) called by the func_b ( ), the stack frame 530-4 corresponds to func_d ( ) called by the func_c ( ), the stack frame 530-5 corresponds to func_e ( ) called by the func_d ( ) and the stack frame 530-6 corresponds to func_f ( ) called by the func_e ( ). For example, the stack frame 530-6 supports the one-phase exception handling mechanism, while other stack frames 540-1, 540-2 . . . 540-5 all support the two-phase exception handling mechanism. The func_f ( ) may throw an exception with a value of 1, which is an integer.

In FIG. 5C, according to the process 430 as described above with reference to FIG. 4B, the search phase may start from the stack frame 530-5 (that is, the first stack frame supporting the two-phase exception handling mechanism in the call stack 530). The search phase will continue to be performed until the stack frame 530-3 which can handle the exception is identified. It can be seen that, the event handler "catch (int)" provided by the stack frame 530-3 can catch the exception with a value of 1. Therefore, the application will not be terminated after the search phase. Instead, a cleanup phase may be performed by destructing the stack frames 530-4, 530-5 and 530-6 which locate on top of the stack frame 530-3 in the call stack 530.

Figure 5D:
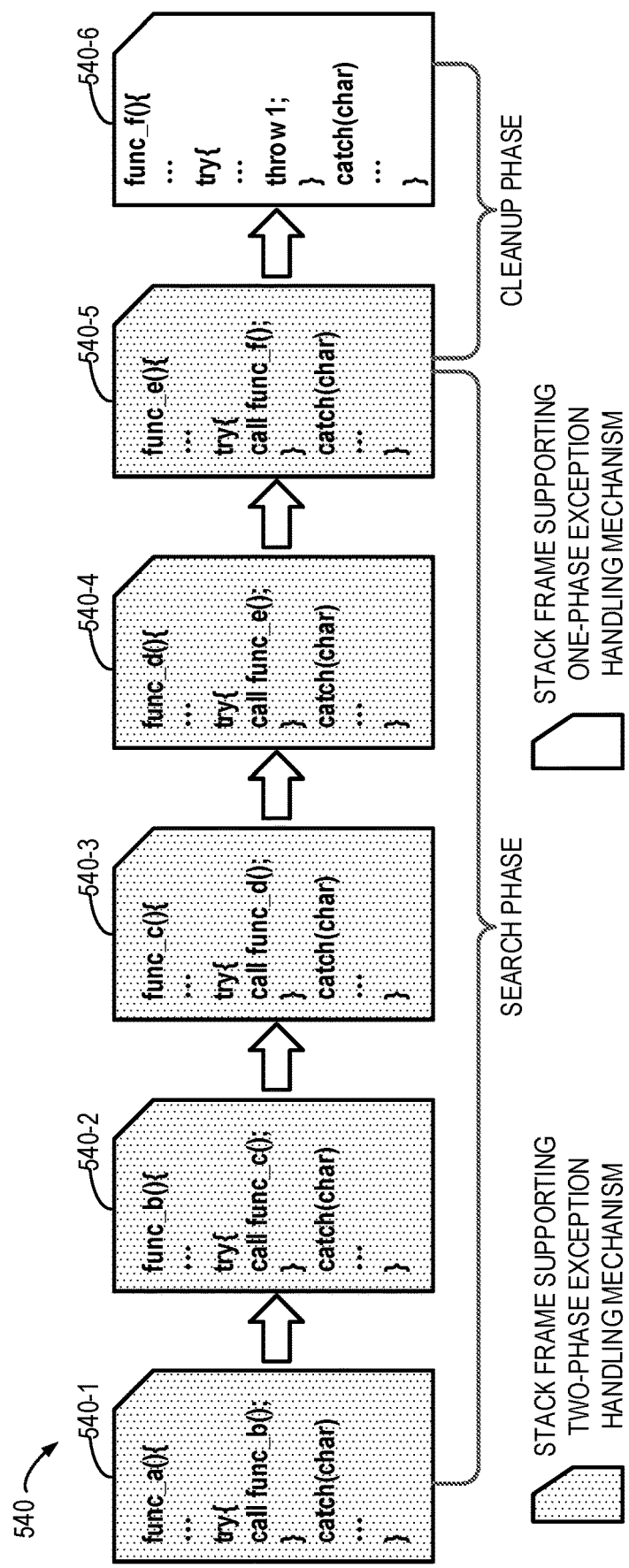

FIG. 5D shows a call stack 540 comprising a plurality of stack frames 540-1, 540-2 . . . 540-6 (collectively referred to as "stack frames 540"), where the stack frame 540-1 corresponds to func_a ( ), the stack frame 540-2 corresponds to func_b ( ) called by the func_a ( ), the stack frame 540-3 corresponds to func_c ( ) called by the func_b ( ), the stack frame 540-4 corresponds to func_d ( ) called by the func_c ( ), the stack frame 540-5 corresponds to func_e ( ) called by the func_d ( ) and the stack frame 540-6 corresponds to func_f ( ) called by the func_e ( ). For example, the stack frame 540-6 supports the one-phase exception handling mechanism, while other stack frames 540-1, 540-2 . . . 540-5 all support the two-phase exception handling mechanism. The func_f ( ) may throw an exception with a value of 1, which is an integer.

In FIG. 5D, according to the process 430 as described above with reference to FIG. 4B, the search phase may start from the stack frame 540-5 (that is, the first stack frame supporting the two-phase exception handling mechanism in the call stack 540). Prior to the search phase, a cleanup phase may be performed by destructing the stack frame 540-6 whose event handler cannot catch the exception. The search phase will continue to be performed until all of the stack frames on bottom of the stack frame 540-5 have been searched. It can be seen that, no stack frame supporting the two-phase exception handling mechanism can handle the exception with a value of 1 and no stack frame supporting the one-phase exception handling mechanism can be found during the search phase. Therefore, the application will be terminated after the search phase.

Figure 5E:
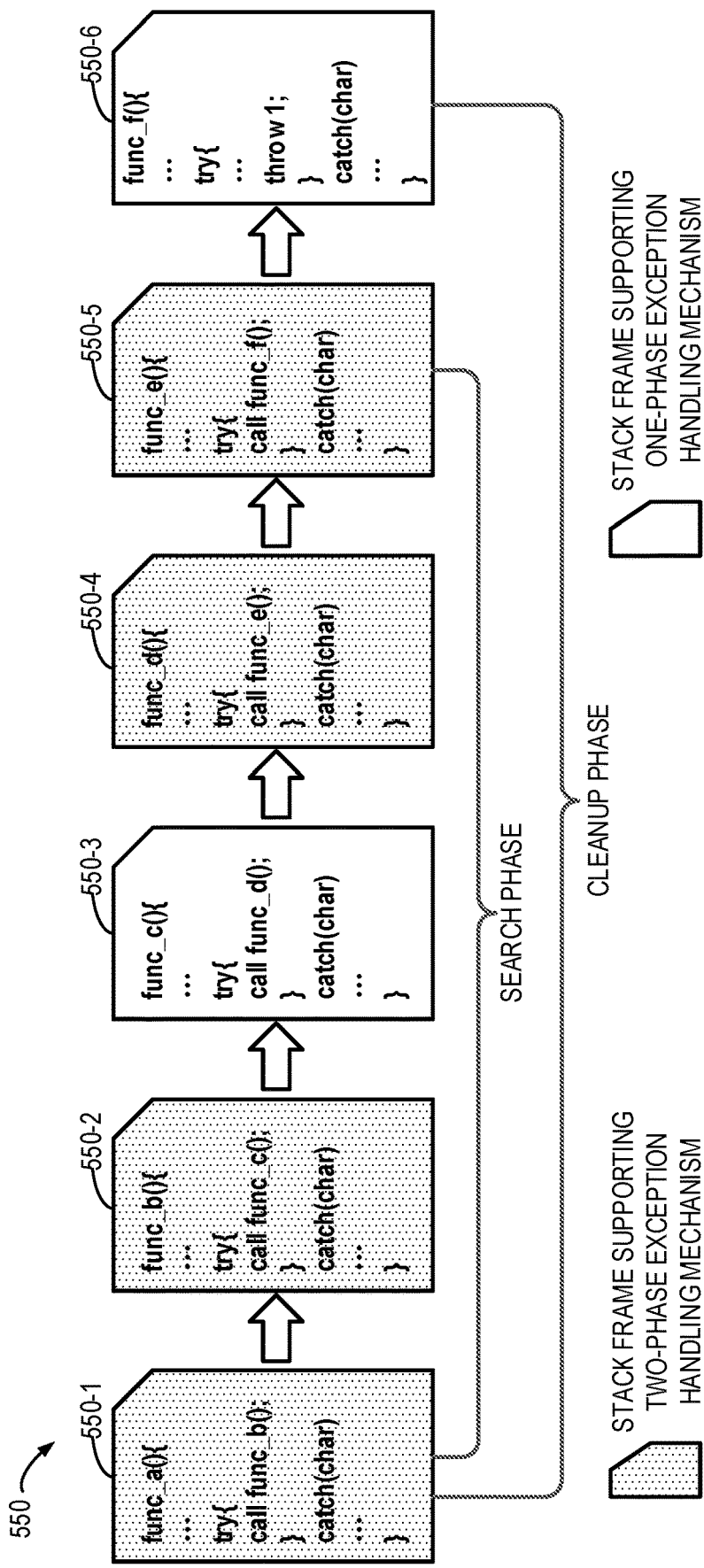

FIG. 5E shows a call stack 550 comprising a plurality of stack frames 550-1, 550-2 . . . 550-6 (collectively referred to as "stack frames 550"), where the stack frame 550-1 corresponds to func_a ( ), the stack frame 550-2 corresponds to func_b ( ) called by the func_a ( ), the stack frame 550-3 corresponds to func_c ( ) called by the func_b ( ), the stack frame 550-4 corresponds to func_d ( ) called by the func_c ( ), the stack frame 550-5 corresponds to func_e ( ) called by the func_d ( ) and the stack frame 550-6 corresponds to func_f ( ) called by the func_e ( ). For example, the stack frames 550-3 and 550-6 supports the one-phase exception handling mechanism, while other stack frames 550-1, 550-2, 550-4 and 550-5 all support the two-phase exception handling mechanism. The func_f ( ) may throw an exception with a value of 1, which is an integer.

In FIG. 5E, according to the process 430 as described above with reference to FIG. 4B, the search phase may start from the stack frame 550-5 (that is, the first stack frame supporting the two-phase exception handling mechanism in the call stack 550). The search phase will continue to be performed until all of the stack frames on bottom of the stack frame 550-5 have been searched. It can be seen that, no stack frame supporting the two-phase exception handling mechanism can handle the exception with a value of 1, but one stack frame 550-3 supporting the one-phase exception handling mechanism can be found during the search phase. Therefore, the application will not be terminated after the search phase. A cleanup phase may be performed by destructing all of the stack frames 550, since no stack frame in the call stack 550 can handle the exception.

Figure 5F:
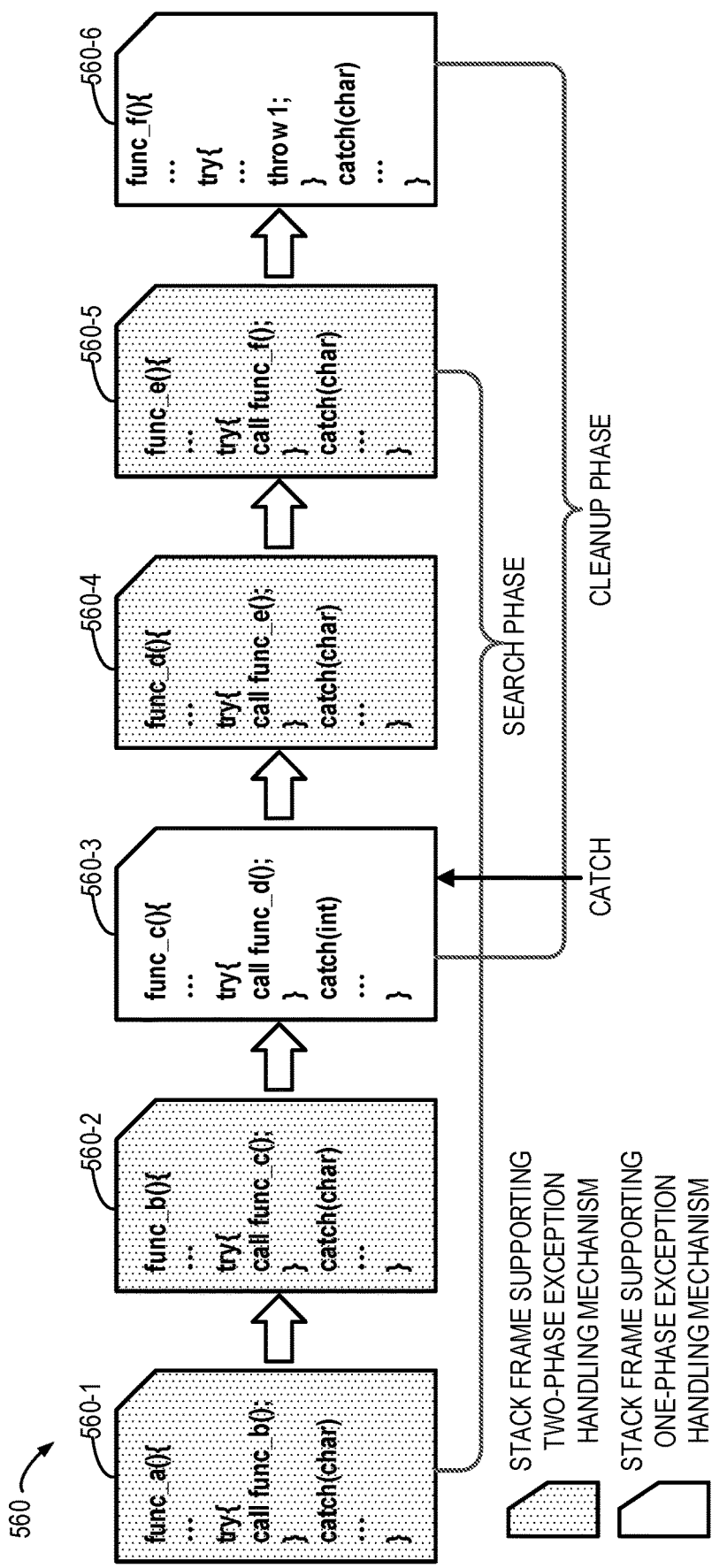

FIG. 5F shows a call stack 560 comprising a plurality of stack frames 560-1, 560-2 . . . 560-6 (collectively referred to as "stack frames 560"), where the stack frame 560-1 corresponds to func_a ( ), the stack frame 560-2 corresponds to func_b ( ) called by the func_a ( ), the stack frame 560-3 corresponds to func_c ( ) called by the func_b ( ), the stack frame 560-4 corresponds to func_d ( ) called by the func_c ( ), the stack frame 560-5 corresponds to func_e ( ) called by the func_d ( ) and the stack frame 560-6 corresponds to func_f ( ) called by the func_e ( ). For example, the stack frames 560-3 and 560-6 supports the one-phase exception handling mechanism, while other stack frames 560-1, 560-2, 560-4 and 560-5 all support the two-phase exception handling mechanism. The func_f ( ) may throw an exception with a value of 1, which is an integer.

In FIG. 5F, according to the process 430 as described above with reference to FIG. 4B, the search phase may start from the stack frame 560-5 (that is, the first stack frame supporting the two-phase exception handling mechanism in the call stack 560). The search phase will continue to be performed until all of the stack frames on bottom of the stack frame 560-5 have been searched. It can be seen that no stack frame supporting the two-phase exception handling mechanism can handle the exception with a value of 1, but one stack frame 560-3 supporting the one-phase exception handling mechanism can be found during the search phase. Therefore, the application will not be terminated after the search phase. A cleanup phase may be performed from the stack frame 560-6 by destructing stack frames whose event handlers cannot catch the exception. The event handler "catch (int)" provided by the stack frame 560-3 can catch the exception with a value of 1. Therefore, the stack frames 560-4, 560-5 and 560-6 which locate on top of the stack frame 560-3 in the call stack 560 may be destructed during the cleanup phase.

Figure 6:
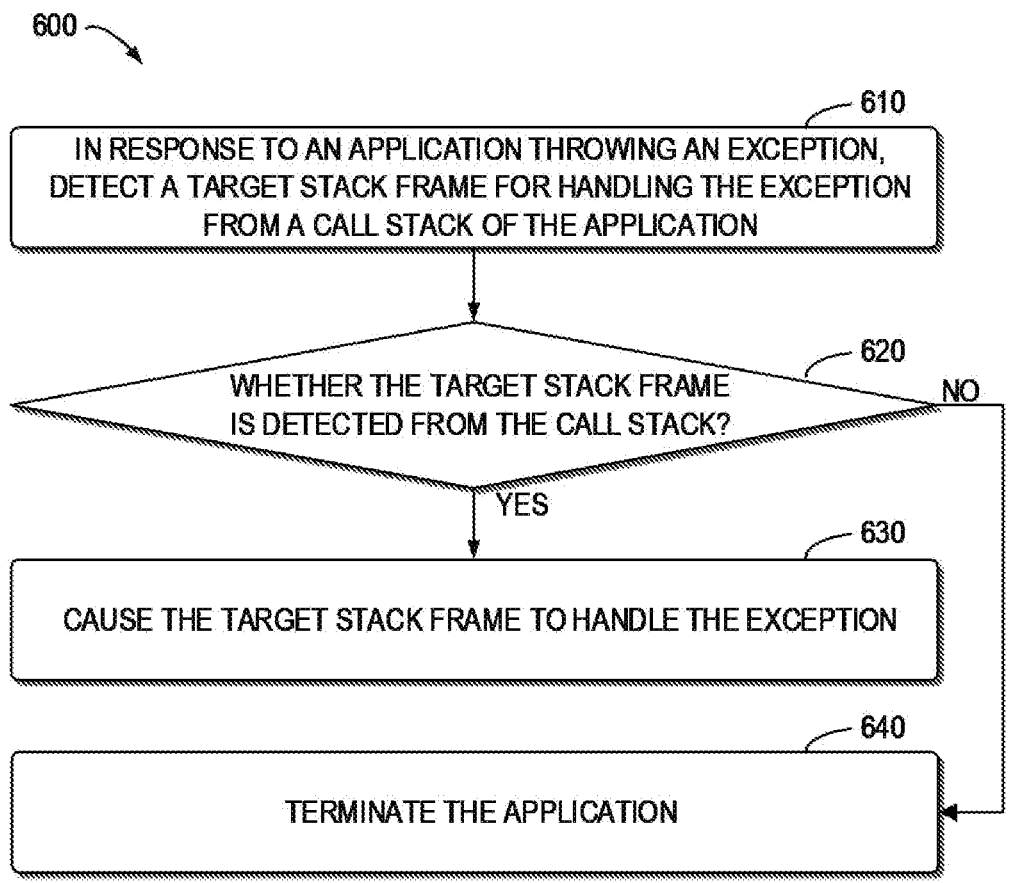
FIG. 6 depicts a flowchart of an example method for exception handling according to embodiments of the present disclosure.

FIG. 6 depicts a flowchart of an example method 600 for exception handling according to embodiments of the present disclosure. For example, the method 600 may be implemented at the runtime library 420 as shown in FIGS. 4A-4B. It is to be understood that the method 600 may also comprise additional blocks (not shown) and/or may omit the illustrated blocks. The scope of the present disclosure described herein is not limited in this aspect.

At block 610, in response to an application (such as, the application 410 as shown in FIGS. 4A-4B) throwing an exception, a target stack frame for handling the exception is detected from a call stack of the application. The call stack comprises a plurality of stack frames. One of the plurality of stack frames corresponds to a function called by the application and supports either a one-phase exception handling mechanism or a two-phase exception handling mechanism.

At block 620, it is determined whether the target stack frame is detected from the call stack. In response to the target stack frame being detected from the call stack, at block 630, the target stack frame is caused to handle the exception. In response to the target stack frame not being detected from the call stack, at block 640, the application is terminated.

In some embodiments, detecting the target stack frame from the call stack comprises: for one of the plurality of stack frames, determining whether the one of the plurality of stack frames supports the one-phase exception handling mechanism or the two-phase exception handling mechanism; in response to determining that the one of the plurality of stack frames supports the one-phase exception handling mechanism, determining whether the one of the plurality of stack frames is capable of handling the exception; in response to determining that the one of the plurality of stack frames is incapable of handling the exception, destructing the one of the plurality of stack frames; and in response to determining that the one of the plurality of stack frames is capable of handling the exception, determining the one of the plurality of stack frames as the target stack frame.

In some embodiments, causing the target stack frame to handle the exception comprises: causing the target stack frame to take over control of the application.

In some embodiments, detecting the target stack frame from the call stack further comprises: in response to determining that at least one of the plurality of stack frames supports the two-phase exception handling mechanism, performing a search on the call stack for a first stack frame supporting the two-phase exception handling mechanism and capable of handling the exception; and in response to the first stack frame being found in the call stack, determining the first stack frame as the target stack frame.

In some embodiments, causing the target stack frame to handle the exception comprises: destructing stack frames located on top of the target stack frame in the call stack; and causing the target stack frame to take over control of the application.

In some embodiments, the method 600 further comprises identifying a second stack frame supporting the one-phase exception handling mechanism during the search performed on the call stack.

In some embodiments, detecting the target stack frame from the call stack further comprises: in response to the first stack frame not being found in the call stack and the second stack frame being identified, determining whether a third stack frame of the plurality of stack frames is capable of handling the exception; in response to determining that the third stack frame is incapable of handling the exception, destructing the third stack frame; and in response to determining that the third stack frame is capable of handling the exception, determining the third stack frame as the target stack frame.

In some embodiments, causing the target stack frame to handle the exception comprises: causing the target stack frame to take over control of the application.

It can be seen that, embodiments of the present disclosure provide a new solution to make the one-phase unwinding exception handling mechanism compatible with the two-phase unwinding exception handling mechanism. As such, a program compiled by a compiler using the one-phase unwinding exception handling mechanism can be linked together with another program compiled by another compiler using the two-phase unwinding exception handling mechanism. The user does not need to recompile all of his/her legacy codes to take advantage of a new compiler. This solution makes the one-phase unwinding exception handling mechanism and the two-phase unwinding exception handling mechanism work together, which helps the user to move his/her application to a new compiler in an evolutionary way.

It should be noted that the processing of exception handling according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   in response to an application throwing an exception, detecting a target stack frame for handling the exception from a call stack of the application, wherein the call stack comprises a plurality of stack frames, and wherein detecting the target stack frame comprises determining whether to perform a search of the call stack based on whether one of the plurality of stack frames supports a one-phase exception handling mechanism or a two-phase exception handling mechanism;
   in response to determining that at least one of the plurality of stack frames supports the two-phase exception handling mechanism, performing a search on the call stack for
      a first stack frame supporting the two-phase exception handling mechanism and capable of handling the exception, and
      a second stack frame supporting the one-phase exception handling mechanism; and
   in response to the target stack frame being detected from the call stack, causing the target stack frame to handle the exception.

2. The method of claim 1, wherein detecting the target stack frame from the call stack further comprises:
   in response to determining that the one of the plurality of stack frames supports the one-phase exception handling mechanism, determining whether the one of the plurality of stack frames is capable of handling the exception; and
   in response to determining that the one of the plurality of stack frames is incapable of handling the exception, destructing the one of the plurality of stack frames.

3. The method of claim 1, wherein detecting the target stack frame from the call stack further comprises:
   in response to determining that the one of the plurality of stack frames supports the one-phase exception handling mechanism, determining whether the one of the plurality of stack frames is capable of handling the exception; and
   in response to determining that the one of the plurality of stack frames is capable of handling the exception, determining the one of the plurality of stack frames as the target stack frame.

4. The method of claim 3, wherein causing the target stack frame to handle the exception comprises:
   causing the target stack frame to take over control of the application.

5. The method of claim 1, wherein detecting the target stack frame from the call stack further comprises:
   in response to the first stack frame being found in the call stack, determining the first stack frame as the target stack frame.

6. The method of claim 5, wherein causing the target stack frame to handle the exception comprises:
   destructing stack frames located on top of the target stack frame in the call stack; and
   causing the target stack frame to take over control of the application.

7. The method of claim 5, further comprising:
   identifying a second stack frame supporting the one-phase exception handling mechanism during the search performed on the call stack.

8. The method of claim 7, wherein detecting the target stack frame from the call stack further comprises:
   in response to the first stack frame not being found in the call stack and the second stack frame being identified, determining whether a third stack frame of the plurality of stack frames is capable of handling the exception; and
   in response to determining that the third stack frame is incapable of handling the exception, destructing the third stack frame.

9. The method of claim 7, wherein detecting the target stack frame from the call stack further comprises:
   in response to the first stack frame not being found in the call stack and the second stack frame being identified, determining whether a third stack frame of the plurality of stack frames is capable of handling the exception; and in response to determining that the third stack frame is capable of handling the exception, determining the third stack frame as the target stack frame.

10. The method of claim 9, wherein causing the target stack frame to handle the exception comprises causing the target stack frame to take over control of the application.

11. The method of claim 1, further comprising:
in response to the target stack frame not being detected from the call stack, terminating the application.

12. A system comprising:
a processing unit; and
a memory coupled to the processing unit and storing instructions thereon, the instructions, when executed by the processing unit, performing actions comprising:
in response to an application throwing an exception, detecting a target stack frame for handling the exception from a call stack of the application, wherein the call stack comprises a plurality of stack frames, and wherein detecting the target stack frame comprises determining whether to perform a search of the call stack based on whether one of the plurality of stack frames supports a one-phase exception handling mechanism or a two-phase exception handling mechanism;
in response to determining that at least one of the plurality of stack frames supports the two-phase exception handling mechanism, performing a search on the call stack for
a first stack frame supporting the two-phase exception handling mechanism and capable of handling the exception, and
a second stack frame supporting the one-phase exception handling mechanism; and
in response to the target stack frame being detected from the call stack, causing the target stack frame to handle the exception.

13. The system of claim 12, wherein detecting the target stack frame from the call stack further comprises:
in response to determining that the one of the plurality of stack frames supports the one-phase exception handling mechanism, determining whether the one of the plurality of stack frames is capable of handling the exception;
in response to determining that the one of the plurality of stack frames is incapable of handling the exception, destructing the one of the plurality of stack frames; and
in response to determining that the one of the plurality of stack frames is capable of handling the exception, determining the one of the plurality of stack frames as the target stack frame.

14. The system of claim 13, wherein causing the target stack frame to handle the exception comprises:
causing the target stack frame to take over control of the application.

15. The system of claim 13, wherein detecting the target stack frame from the call stack further comprises:

in response to the first stack frame being found in the call stack, determining the first stack frame as the target stack frame.

16. The system of claim 15, wherein causing the target stack frame to handle the exception comprises:
destructing stack frames located on top of the target stack frame in the call stack; and
causing the target stack frame to take over control of the application.

17. The system of claim 15, wherein the actions further comprise:
identifying a second stack frame supporting the one-phase exception handling mechanism during the search performed on the call stack.

18. The system of claim 17, wherein detecting the target stack frame from the call stack further comprises:
in response to the first stack frame not being found in the call stack and the second stack frame being identified, determining whether a third stack frame of the plurality of stack frames is capable of handling the exception;
in response to determining that the third stack frame is incapable of handling the exception, destructing the third stack frame; and
in response to determining that the third stack frame is capable of handling the exception, determining the third stack frame as the target stack frame.

19. The system of claim 18, wherein causing the target stack frame to handle the exception comprises:
causing the target stack frame to take over control of the application.

20. A computer program product comprising a computer readable storage medium having program instructions embodied therewith, the program instructions executable by a processor to cause the processor to perform a method comprising:
in response to an application throwing an exception, detecting a target stack frame for handling the exception from a call stack of the application, wherein the call stack comprises a plurality of stack frames, and wherein detecting the target stack frame comprises determining whether to perform a search of the call stack based on whether one of the plurality of stack frames supports a one-phase exception handling mechanism or a two-phase exception handling mechanism;
in response to determining that at least one of the plurality of stack frames supports the two-phase exception handling mechanism, performing a search on the call stack for
a first stack frame supporting the two-phase exception handling mechanism and capable of handling the exception, and
a second stack frame supporting the one-phase exception handling mechanism; and
in response to the target stack frame being detected from the call stack, causing the target stack frame to handle the exception.

* * * * *